US00RE50187E

(19) United States
(12) Reissued Patent
Desai et al.

(10) Patent Number: US RE50,187 E
(45) Date of Reissued Patent: Oct. 22, 2024

(54) DETERMINING REDUNDANT RADIOS

(71) Applicant: Cisco Technology, Inc., San Jose, CA (US)

(72) Inventors: Vishal S. Desai, San Jose, CA (US); Allaukik Abhishek, Irving, TX (US); Pooya Monajemi, San Jose, CA (US); Young Il Choi, San Jose, CA (US)

(73) Assignee: Cisco Technology, Inc., San Jose, CA (US)

(21) Appl. No.: 17/710,937

(22) Filed: Mar. 31, 2022

Related U.S. Patent Documents

Reissue of:
(64) Patent No.: 10,609,571
Issued: Mar. 31, 2020
Appl. No.: 15/475,577
Filed: Mar. 31, 2017

U.S. Applications:
(60) Provisional application No. 62/333,599, filed on May 9, 2016.

(51) Int. Cl.
*H04W 72/29* (2023.01)
*H04B 1/48* (2006.01)
(Continued)

(52) U.S. Cl.
CPC ..... *H04W 72/29* (2023.01); *H04B 1/48* (2013.01); *H04W 16/10* (2013.01); *H04W 16/14* (2013.01);
(Continued)

(58) Field of Classification Search
CPC . H04W 72/29; H04W 24/02; H04W 72/0453; H04W 16/14; H04W 16/22;
(Continued)

(56) References Cited

U.S. PATENT DOCUMENTS 9,398,556 B2 7/2016 Fix et al.
10,236,998 B1 * 3/2019 Monajemi ..... H04B 15/00
(Continued)

FOREIGN PATENT DOCUMENTS

EP 3059992 A1 8/2016
EP 3908027 A4 11/2021
(Continued)

OTHER PUBLICATIONS

Written Opinion for International Application No. PCT/US2017/031599, mailed Aug. 7, 2017, 9 pages.
(Continued)

*Primary Examiner* — C. Michelle Tarae
(74) *Attorney, Agent, or Firm* — Patterson + Sheridan, LLP

(57) ABSTRACT

An algorithm for determining redundant radios in APs is disclosed. The algorithm first performs a coverage peak flattening algorithm to predict an impact to the total coverage area if a radio in a selected AP does not transmit signals in a frequency band. If the impact to the total coverage area is acceptable, the algorithm then performs a multi-point check algorithm to determine whether the radio in the selected AP is redundant in the frequency band. After determining that the radio in the selected AP is redundant in the frequency band, the algorithm transforms the redundant radio into various services based on the network deployment and user preference.

59 Claims, 11 Drawing Sheets

(51) Int. Cl.

| | |
|---|---|
| ***H04W 16/10*** | (2009.01) |
| ***H04W 16/14*** | (2009.01) |
| ***H04W 16/22*** | (2009.01) |
| ***H04W 24/02*** | (2009.01) |
| ***H04W 64/00*** | (2009.01) |
| ***H04W 72/0453*** | (2023.01) |
| ***H04W 76/14*** | (2018.01) |
| ***H04W 84/12*** | (2009.01) |
| ***H04W 88/12*** | (2009.01) |

(52) U.S. Cl.
CPC ..... *H04W 16/22* (2013.01); *H04W 24/02* (2013.01); *H04W 64/003* (2013.01); *H04W 72/0453* (2013.01); *H04B 2001/485* (2013.01); *H04W 76/14* (2018.02); *H04W 84/12* (2013.01); *H04W 88/12* (2013.01)

(58) Field of Classification Search
CPC ... H04W 16/10; H04W 64/003; H04W 84/12; H04W 76/14; H04W 88/12; H04B 1/48; H04B 2001/485
See application file for complete search history.

(56) References Cited

U.S. PATENT DOCUMENTS

| | | | | |
|---|---|---|---|---|
| 10,433,189 | B2 | 10/2019 | Desai et al. | |
| 10,609,571 | B2 | 3/2020 | Desai et al. | |
| 2001/0050943 | A1* | 12/2001 | Mahany | H04W 28/065 375/E1.033 |
| 2004/0137908 | A1* | 7/2004 | Sinivaara | H04B 7/022 455/452.1 |
| 2006/0109799 | A1 | 5/2006 | Tseng et al. | |
| 2007/0232307 | A1* | 10/2007 | Ibrahim | H04W 36/30 455/436 |
| 2009/0257380 | A1 | 10/2009 | Meier | |
| 2011/0032149 | A1 | 2/2011 | Leabman | |
| 2012/0314587 | A1* | 12/2012 | Curticapean | G01S 5/0284 370/252 |
| 2013/0028158 | A1 | 1/2013 | Lee et al. | H04W 52/0206 370/311 |
| 2014/0036787 | A1* | 2/2014 | Ganu | H04W 16/10 370/329 |
| 2014/0036788 | A1* | 2/2014 | Ganu | H04W 52/367 370/329 |
| 2014/0314003 | A1 | 10/2014 | Zhou et al. | |
| 2015/0223084 | A1 | 8/2015 | Lightstone et al. | |
| 2015/0245370 | A1 | 8/2015 | Arogyaswami | |
| 2015/0312881 | A1* | 10/2015 | Agrawal | H04W 28/0226 455/456.1 |
| 2015/0334613 | A1 | 11/2015 | Awad | |
| 2017/0324439 | A1 | 11/2017 | Desai et al. | |
| 2017/0325104 | A1 | 11/2017 | Desai et al. | |

FOREIGN PATENT DOCUMENTS

| | | | |
|---|---|---|---|
| EP | 3456079 | B1 | 4/2022 |
| WO | 2005015839 | A1 | 2/2005 |
| WO | 2015055871 | A1 | 4/2015 |
| WO | 2015112173 | A1 | 7/2015 |
| WO | 2017196751 | A1 | 11/2017 |

OTHER PUBLICATIONS

International Search Report for Application No. PCT/US2017/031599 dated Aug. 7, 2017.

PCT, International Preliminary Report on Patentability for Application PCT/US2017/031599 dated Nov. 13, 2018.

European Patent Office, Extended European Search Report for Application 21181378.7-1231 dated Sep. 13, 2021.

* cited by examiner

DETERMINING REDUNDANT RADIOS

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

*This application is an application for reissue for U.S. Pat. No. 10,609,571, which is incorporated herein by reference in its entirety.*

CROSS-REFERENCE TO RELATED APPLICATIONS

This application claims the benefit of provisional patent application Ser. No. 62/333,599, filed May 9, 2016. The aforementioned related provisional patent application is herein incorporated by reference in its entirety.

BACKGROUND

In order to deliver better Wi-Fi service and provide higher throughput, there is a significant increase in density of APs (access points) to cover large areas as compared to a few years ago.

While increasing the density of APs improves Wi-Fi availability and throughput, it brings new challenges in densely populated deployments. For example, radios in multiple APs that are in close proximity may transmit signals using the same channel of the same frequency band which can cause high co-channel interference between the radios. High co-channel interference can negatively affect the performance of the radios in the APs.

SUMMARY

One embodiment of the present disclosure provides a device that includes a processor and a memory. The memory contains a program that, when executed on the processor, performs an operation. The operation includes, for an area covered by a plurality of access points operating on a first channel in a frequency band, when a radio in a first access point of the plurality of access points does not operate on the first channel in the frequency band, simulating whether the area covered by at least one other radio in the plurality of access points satisfies a predetermined coverage threshold. The operation also includes, upon simulating that the area covered by at least one other radio in the plurality of access points satisfies the predetermined coverage threshold, determining that the radio in the first access point is redundant. The operation further includes, upon determining that the radio in the first access point is redundant, prohibiting the radio in the first access point from operating on the first channel in the frequency band.

One embodiment of the present disclosure provides a computer program product that includes a non-transitory computer-readable storage medium having computer readable program code embodied therewith. For an area covered by a plurality of access points operating on a first channel in a frequency band, when a radio in a first access point of the plurality of access points does not operate on the first channel in the frequency band, the computer readable program code simulates whether the area covered by at least one other radio in the plurality of access points satisfies a predetermined coverage threshold. Upon simulating that the area covered by at least one other radio in the plurality of access points satisfies the predetermined coverage threshold, the computer readable program code determines that the radio in the first access point is redundant. Upon determining that the radio in the first access point is redundant, the computer readable program code prohibits the radio in the first access point from operating on the first channel in the frequency band.

One embodiment of the present disclosure provides a method. The method includes, for an area covered by a plurality of access points operating on a first channel in a frequency band, when a radio in a first access point of the plurality of access points does not operate on the first channel in the frequency band, simulating whether the area covered by at least one other radio in the plurality of access points satisfies a predetermined coverage threshold. The method also includes, upon simulating that the area covered by at least one other radio in the plurality of access points satisfies the predetermined coverage threshold, determining that the radio in the first access point is redundant. The method further includes, upon determining that the radio in the first access point is redundant, prohibiting the radio in the first access point from operating on the first channel in the frequency band.

DETAILED DESCRIPTION

Figure 1:
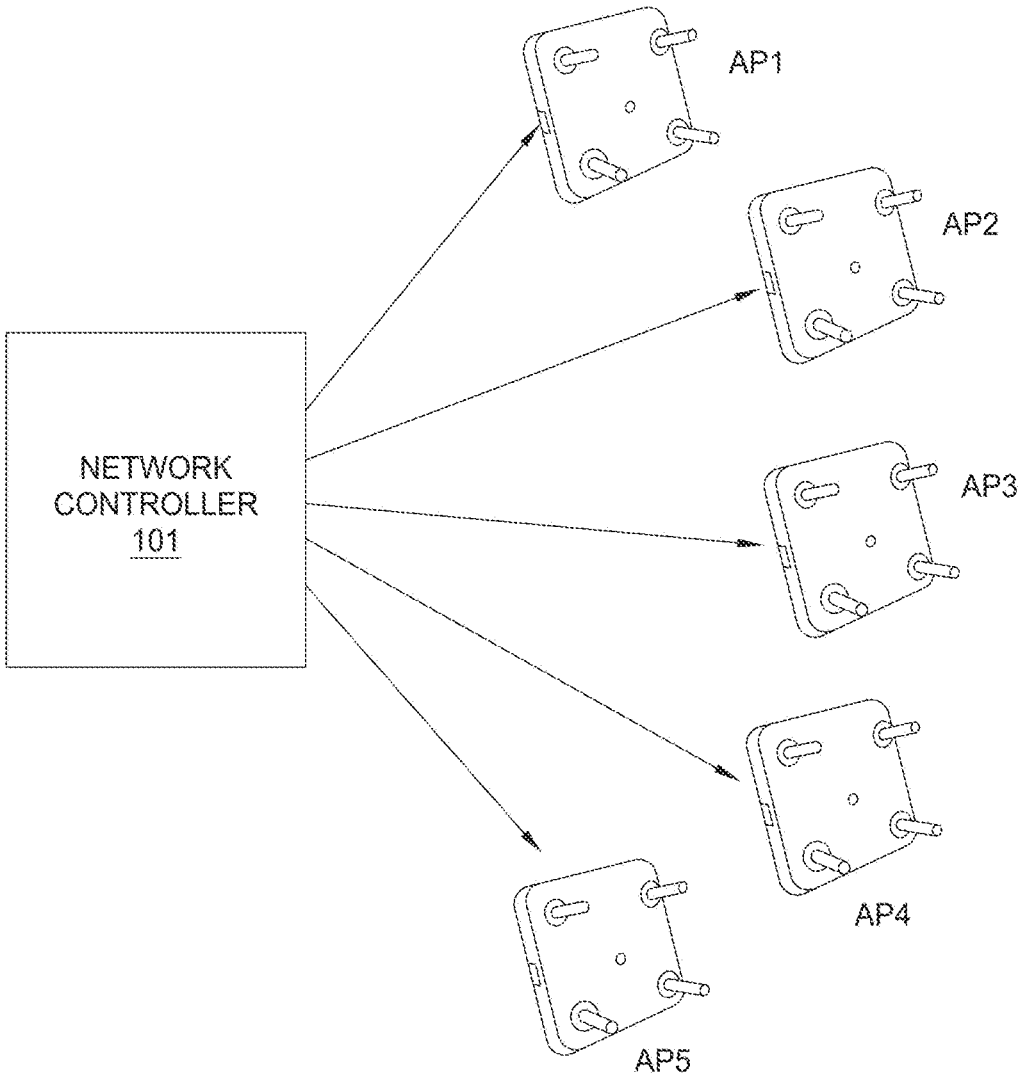
FIG. 1 illustrates a network controller controlling multiple APs in a network, according to one embodiment herein.

One goal of Radio Resource Management (RRM) Transmit Power Control algorithms is to reduce co-channel interference without impacting the effective coverage radius of a radio. However, in dense deployments such as at enterprise sites, stadium venues or educational institutions, even with standard radio frequency (RF) planning and site surveys, the APs tend to suffer from high co-channel interference. That is, multiple radios in multiple APs in close proximity may transmit signals using the same channel of the same frequency band. Though the problem is usually seen with 2.4 GHz frequency band, radios using the 5 GHz frequency band (or other frequency bands) can also experience high co-channel interference.

In some instances, a network engineer considers only the 5 GHz frequency band when determining the number and the layout of the APs to provide wireless access for a defined area. The 2.4 GHz frequency band is usually considered as secondary to the 5 GHz frequency band. Because of the lower frequency, wireless signals in the 2.4 GHz frequency band can travel further than wireless signals in the 5 GHz frequency band. Thus, coverage determinations made for the 5 GHz frequency band are not directly applicable to the 2.4 GHz frequency band. Therefore, the 2.4 GHz frequency band may be configured manually, e.g., a system administrator simply makes an educated guess on how many 2.4 GHz radios are needed to provide sufficient coverage to the defined area. To prevent contention and reduce co-channel interference between radios in multiple APs in the 2.4 GHz frequency band, a system administrator may manually power down some of the redundant 2.4 GHz radios. This manual method, however, can be cumbersome, tedious, and results in coverage holes. The present disclosure provides an algorithm that can automatically determine redundant radios in APs without creating coverage holes.

FIG. 1 illustrates a network controller controlling a plurality of APs in a network, according to one embodiment herein. In FIG. 1, the network controller 101 controls a plurality of APs from AP1 to AP5. In one embodiment, each AP includes two radios where the first radio is a dedicated 5 GHz radio that transmits signals in the 5 GHz frequency band and the second radio is a XOR radio that can dynamically switch between the 2.4 GHz and 5 GHz frequency bands. That is, the second radio can transmit signals in either the 2.4 GHz frequency band or the 5 GHz frequency band. The two radios in an AP can be active simultaneously on the same frequency band or on different frequency bands. For example, the XOR radio and the dedicated 5 GHz radio in an AP can simultaneously transmit signals in the 5 GHz frequency band by using different channels of the 5 GHz frequency band. In one embodiment, the network controller 101 can be an AP, e.g., a master AP that can control other APs. In another embodiment, the network controller 101 can be a separate computing device. In another embodiment, the network controller 101 can be a device in a cloud computing environment.

In one embodiment, the APs can offer various services based on the network deployment and client density. For example, the AP1-AP5 have two operation modes, i.e., a local working mode and a non-client serving role. The operation modes apply to both radios of an AP. Also, the radios in AP1-AP5 have two radio roles, i.e., a dedicated radio role and an XOR radio role. In one embodiment, when operating in the local working mode, the dedicated 5 GHz radio transmits signals in the 5 GHz frequency band and the XOR radio transmits signals in either the 2.4 GHz frequency band or the 5 GHz frequency band. In the non-client serving role, however, the dedicated 5 GHz radio and the XOR radio do not transmit signals in either the 5 GHz or the 2.4 GHz frequency bands. Also, in one embodiment, in the non-client serving role, the radios consume lower power than in the local working mode. In another embodiment, in the non-client serving role, the radios are passive monitors that can receive signals transmitted on the 5 GHz or the 2.4 GHz frequency bands but do not transmit signals.

In one embodiment, the network controller 101 determines whether a radio in an AP is redundant. That is, the network controller 101 determines whether coverage area of the radio is already covered sufficiently (fully or almost fully) by at least one radio in a neighboring AP. For example, if AP1's XOR radio transmits signals using a channel of the 2.4 GHz frequency band and if AP2 and AP3's XOR radios also transmit signals using the same channel of the 2.4 GHz frequency band which cover the same area as AP1's XOR radio, then AP1's XOR radio is redundant. In this situation, AP1's redundant XOR radio may cause co-channel interference with AP2 and AP3's XOR radios.

If the network controller 101 determines that a radio in an AP is redundant in a frequency band, the network controller 101 manages the redundant radio to mitigate co-channel interference in the frequency band, e.g., the network controller 101 prohibits the redundant radio from transmitting signals in the frequency band. In one embodiment, the network controller 101 instructs AP1's XOR radio to switch to the 5 GHz frequency band. That is, the network controller 101 switches AP1's XOR radio to transmit signals in the 5 GHz frequency band, so that AP1's XOR radio does not transmit signals in the 2.4 GHz frequency band. Thus, the XOR radio of AP1 not only does not cause co-channel interference in the 2.4 GHz frequency band but also increases capacity in the 5 GHz frequency band. In another embodiment, the network controller 101 instructs AP1's XOR radio to change from the local working mode to the non-client serving role so that AP1's XOR radio does not transmit signals in the 2.4 GHz frequency band and does not cause co-channel interference in that band. In other embodiments, based on the network deployment and user preference, the network controller 101 instructs AP1's XOR radio to change from the local working mode to provide other services such as Sensor Role for Wireless Service Assurance, Pre-emptive Channel Availability Check (CAC) for Zero-Touch Dynamic Frequency Selection (DFS) or to operate as Standby Radio for Client-Aware Hot-Standby mode.

FIG. 1 illustrates only one embodiment herein. In other embodiments, the network controller 101 may control a different number of APs. Moreover, the APs may include a different number of radios. For example, the APs may include a dedicated 5 GHz radio, a dedicated 2.4 GHz radio, and a XOR radio. In other embodiments, the radios of the APs may transmit signals in frequency bands different from the 5 GHz frequency band and the 2.4 GHz frequency band, as understood by an ordinary person in the art.

Figure 2:
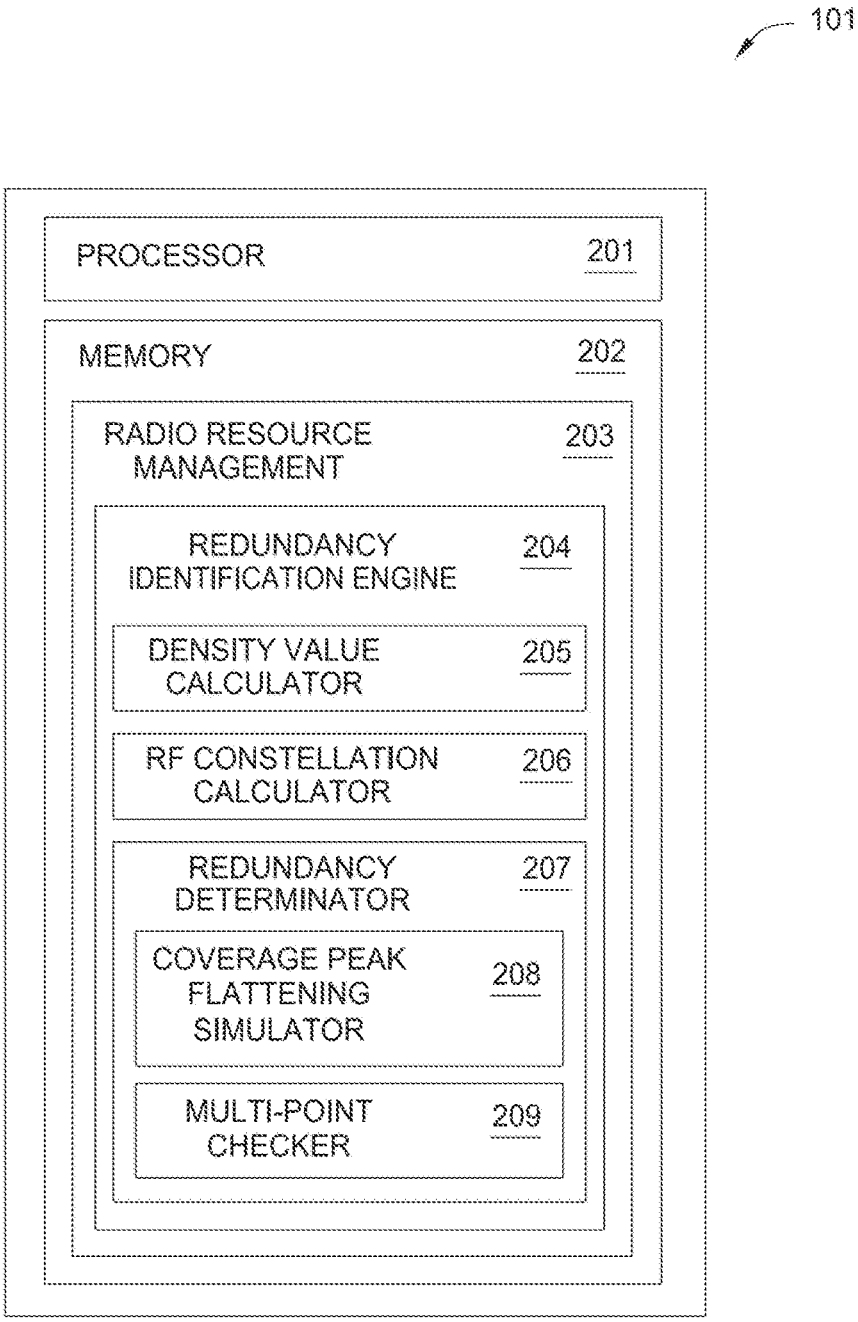
FIG. 2 illustrates a network controller, according to one embodiment herein.

FIG. 2 illustrates the network controller 101, according to one embodiment herein. The network controller 101 includes a processor 201 and a memory 202. The processor 201 may be any computer processor capable of performing the functions described herein. Although memory 202 is shown as a single entity, memory 202 may include one or more memory devices having blocks of memory associated with physical addresses, such as random access memory (RAM), read only memory (ROM), flash memory or other types of volatile and/or non-volatile memory.

The memory 202 includes a radio resource management (RRM) component 203. The RRM component 203 provides a system level management of co-channel interference, radio resources, and other radio transmission characteristics in the network. The RRM component 203 includes core algorithms for controlling parameters such as transmit power, user allocation, beamforming, data rates, handover criteria, modulation scheme, error coding scheme, etc. The RRM component 203 aims to utilize the radio-frequency resources and radio network infrastructure in an efficient way.

In one embodiment, the RRM component 203 receives inter-radio measurement data reported from the APs controlled by the network controller 101. The inter-radio measurement data may include but is not limited to the channel frequency between two radios of different APs, transmit power, antenna information and the received signal strength indicator (RSSI) or path loss between two radios of different APs.

In one embodiment, the RRM component 203 performs the inter-radio measurement based on a neighbor discovery protocol (NDP). By using NDP, each radio in each AP sends a broadcast message to all other radios in all other APs on all channels so that all other radios operating on different channels can receive the broadcast message. The broadcast message may be a neighbor discovery packet with a predefined packet format. When a radio in an AP receives the neighbor discovery packet, it uses the neighbor discovery packet to obtain the inter-radio measurement data, and forwards the neighbor discovery packet and the inter-radio measurement data to the RRM component 203. Based on the received neighbor discovery packet and the inter-radio measurement data, the RRM component 203 can understand how every radio using a channel hears every other radio using the same channel and how every AP relates to other APs in the network controlled by the network controller 101.

The RRM component 203 includes a redundancy identification engine (RIE) 204. Based on the measurement data received by the RRM component 203, the RIE 204 can identify redundant radios in APs in a frequency band. The RIE 204 includes a density value calculator 205, a radio frequency (RF) constellation calculator 206 and a redundancy determinator 207. The density value calculator 205 identifies candidate APs for redundancy determination, the RF constellation calculator 206 calculates relative locations of neighboring APs, and the redundancy determinator 207 determines whether a radio in an AP is redundant.

The redundancy determinator 207 includes a coverage peak flattening simulator 208 and a multi-point checker 209. The coverage peak flattening simulator 208 models a total coverage area covered by radios in a plurality of APs and determines whether multiple radios are covering an overlapping area of the total coverage area. The coverage peak flattening simulator 208 also predicts an impact to the total coverage area if a radio in a selected AP does not transmit signals in a frequency band.

After the coverage peak flattening simulator 208 determines that the impact to total coverage area is acceptable if the radio in the selected AP does not transmit signals in a frequency band, the multi-point checker 209 further checks whether the radio is contributing to coverage areas of one or more radios in neighboring APs that are already determined as redundant. For example, if a radio in a neighboring AP does not transmit signals in the frequency band because the radio in the neighboring AP was previously identified by the RIE 204 as redundant, the multi-point checker 209 checks whether the radio in the selected AP is transmitting signals in the original coverage area (the coverage area before the redundant radio is prohibited from transmitting signals) of the redundant radio in the neighboring AP. If the coverage area of the radio in the selected AP does not overlap with the coverage areas of one or more radios in neighboring APs that are already determined as redundant, the multi-point checker 209 further ensures that the coverage area of the radio in the selected AP is sufficiently covered by one or more radios in neighboring APs that are transmitting signals in the frequency band. Algorithms implemented by the coverage peak flattening simulator 208 and the multi-point checker 209 will be described in greater detail below.

When a radio in an AP is identified as redundant by the RIE 204, the RRM component 203 manages the redundant radio in the AP to mitigate co-channel interference in a frequency band, e.g., the RRM component 203 sends configuration messages to the AP either to switch the redundant radio to transmit signals in a different frequency band or change the radio into the non-client serving role. Thus, the redundant radio is prohibited from transmitting signals in the current frequency band or is prohibited from operating on its assigned channel to serve clients, so that co-channel interference caused by the redundant radio is mitigated.

Figure 3:
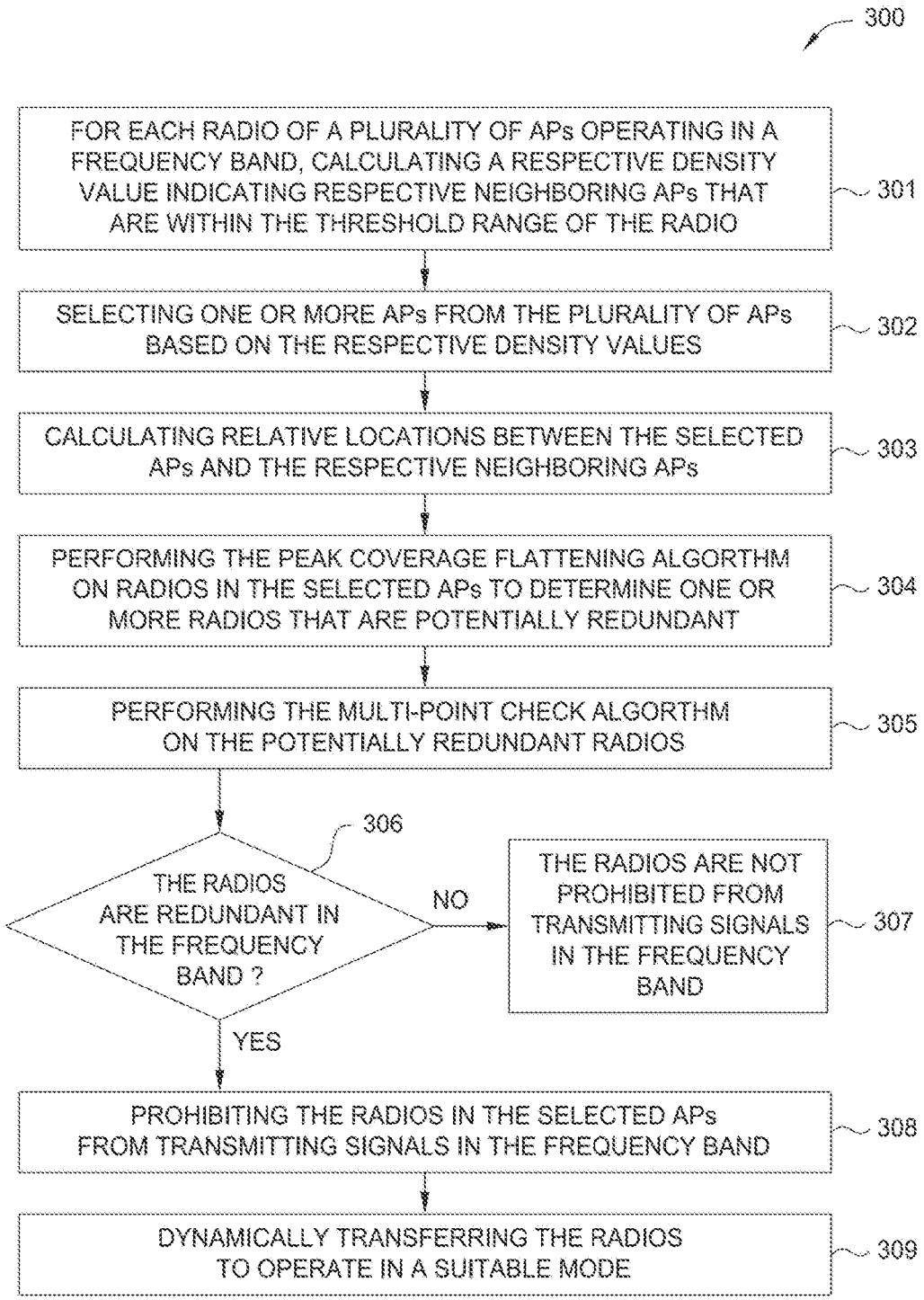
FIG. 3 illustrates a method to determine redundant radios, according to one embodiment herein.

FIG. 3 illustrates a method 300 to determine redundant radios, according to one embodiment herein. At block 301, the density value calculator 205 calculates, for each radio of a plurality of APs operating in a frequency band, a respective density value based on radios in neighboring APs that are within a threshold range of the radio, e.g, within a predefined distance from the radio. In one embodiment, radios in the neighboring APs are in direct communication with the radio in the frequency band, e.g., the 2.4 GHz frequency band. In one embodiment, the RRM component 203 uses NDP to calculate a respective density value indicating respective neighboring APs that are in direct communication with a radio in an AP.

Using NDP, a radio in an AP sends a broadcast message to all other radios in the neighboring APs using the frequency band. In one embodiment, when a neighboring AP receives the neighbor discovery packet, the neighboring AP forwards the neighbor discovery packet with information indicating that the neighbor discovery packet is directly received from the sending AP to the RRM component 203. In this way, the RRM component 203 can identify the neighbors of the AP that sent the broadcast message.

In one embodiment, after the neighboring APs are identified for each AP controlled by the network controller 101, the density value calculator 205 determines a density value for radios of the APs. Generally, the stronger neighbor relationship a radio has, the greater the density value assigned to that radio. For example, the more neighbors a radio has, the greater the density value assigned to that radio.

At block 302, the density value calculator 205 selects one or more APs from the plurality of APs based on the respective densities values. In one embodiment, the density value calculator 205 selects the AP having a radio with the highest density value as the first candidate AP for redundancy determination. The second and the following candidate APs can be selected similarly, as understood by an ordinary person in the art.

In other embodiments, the density value calculator 205 selects an AP having a radio with the least load from the plurality of APs as the first candidate AP for redundancy determination. In other embodiments, the density value calculator 205 selects the AP having a radio with the highest cumulative RSSI for the first n neighbors as the first candidate AP for redundancy determination.

At block 303, for each selected AP, the RF constellation calculator 206 calculates locations of the selected AP's respective neighboring APs relative to the selected AP. In one embodiment, the RF constellation calculator 206 calculates locations of neighboring APs relative to the selected AP, based on the inter-radio measurement data such as the RSSI or path loss between two radios in different APs, as explained above.

In one embodiment, the RF constellation calculator 206 uses the inverse of the indoor Okumura-Hata model to derive estimated distances between each pair of APs. Using this model, the RF constellation calculator 206 can use the RSSI and/or path loss between two radios of each pair of APs to derive estimated distances between each pair of APs, as understood in the art. After calculating the distances between each pair of APs, without loss of generality, the selected AP is placed on the origin and has a coordinate of (0, 0). The RF constellation calculator 206 calculates the relative location (e.g., coordinates) of each neighboring AP to the selected AP, based on the estimated distances between each pair of APs, as understood in the art.

At block 304, the coverage peak flattening simulator 208 performs a peak coverage flattening algorithm on radios in the selected APs to determine one or more radios that are potentially redundant in the frequency band. A radio in an AP is potentially redundant if the coverage peak flattening simulator 208 predicts that removing the radio does not affect the total coverage area, thus the coverage area of the radio in the AP is sufficiently covered by at least one radio of the AP's neighboring APs. In one embodiment, the coverage peak flattening simulator 208 performs a peak coverage flattening algorithm on the XOR radios in the selected APs to determine whether the XOR radios are potentially redundant in the 2.4 GHz frequency band. The peak coverage flattening algorithm is described in detail later using FIGS. 4-8.

At block 305, once the coverage peak flattening simulator 208 has provided a list of potentially redundant radios, the multi-point checker 209 then performs the multi-point check algorithm on the potentially redundant radios. For each potentially redundant radio, at block 305, the multi-point checker 209 further checks whether the radio has a coverage area that overlaps with coverage areas of radios in neighboring APs that were already determined as redundant. If not, at block 305, the multi-point checker 209 further ensures that the coverage area of the radio in the selected AP is sufficiently covered by one or more radios in neighboring APs. In other words, after the coverage peak flattening simulator 208 predicts that the coverage area of the radio in the selected AP is sufficiently covered by at least one radio of its neighboring APs and the radio is potentially redundant, the multi-point checker 209 verifies whether the prediction made by the coverage peak flattening simulator 208 is correct. The multi-point check algorithm is described in detail later using FIGS. 9-10.

At block 306, the multi-point checker 209 determines whether the radios are actually redundant. If the answer is "NO" at block 306. The method 300 proceeds to block 307. At block 307, the RRM component 203 does not prohibit the potentially redundant radios identified at block 304 from transmitting signals in the frequency band since these radios are not redundant—i.e., their coverage areas are not sufficiently covered by radios in neighboring APs.

On the other hand, if the answer is "YES" at block 306, the method 300 proceeds to block 308. At block 308, the RRM component 203 prohibits the redundant radio in the selected AP from transmitting signals in the frequency band.

In one embodiment, in order to prohibit the redundant radio in the selected AP from transmitting signals in the frequency band, either the redundant radio is switched to transmit signals in a different frequency band or the redundant radio is changed to the non-client serving role. Specifically, once a radio in an AP is identified as redundant by the RIE 204, the RRM component 203 sends configuration messages to the AP either to switch the redundant radio to transmit signals in a different frequency band or change the radio into a non-client serving role.

For example, if an XOR radio of an AP that is transmitting signals in the 2.4 GHz frequency band is determined as a redundant radio, the RRM component 203 can either switch the XOR radio to transmit signals in the 5 GHz frequency band or change the XOR radio into the non-client serving role depending on the users' requirements or the usages of the network. For example, the RRM component 203 can switch the XOR radio to transmit signals in the 5 GHz frequency band to serve more users in the 5 GHz frequency band, or the RRM component 203 can change the XOR radio into the non-client serving role. Because the redundant XOR radio is no longer transmitting signals in the 2.4 GHz frequency band, the redundant XOR radio does not cause co-channel interference in the 2.4 GHz frequency band.

In one embodiment, when users in the 2.4 GHz frequency band are associated with a weaker RSSI to a nearby AP or in case that a neighboring 2.4 GHz radio does not work properly, the RRM component 203 can revert the XOR radio back to the 2.4 GHz frequency band to transmit signals in the 2.4 GHz frequency band to avoid coverage holes in the 2.4 GHz frequency band. When the XOR radio is reverted back to the 2.4 GHz frequency band, the XOR radio will be ignored in future redundancy identification for a time period, e.g., the next 60 minutes.

After the RRM component 203 prohibits the redundant radio from transmitting signals in the frequency band or prohibits the redundant radio from operating on its assigned channel to serve clients, at block 309, the RRM component 203 dynamically transfers the radio to operate in a suitable operation mode, based on the users' requirements and/or the network conditions.

In one embodiment, when RIE 204 of the network controller 101 identifies one or more redundant radios, RRM 203 of the network controller 101 utilizes channel, power and client optimization algorithms to evaluate RF conditions, available channel sets and client density in order to determine how to operate the redundant radios.

Figure 4:
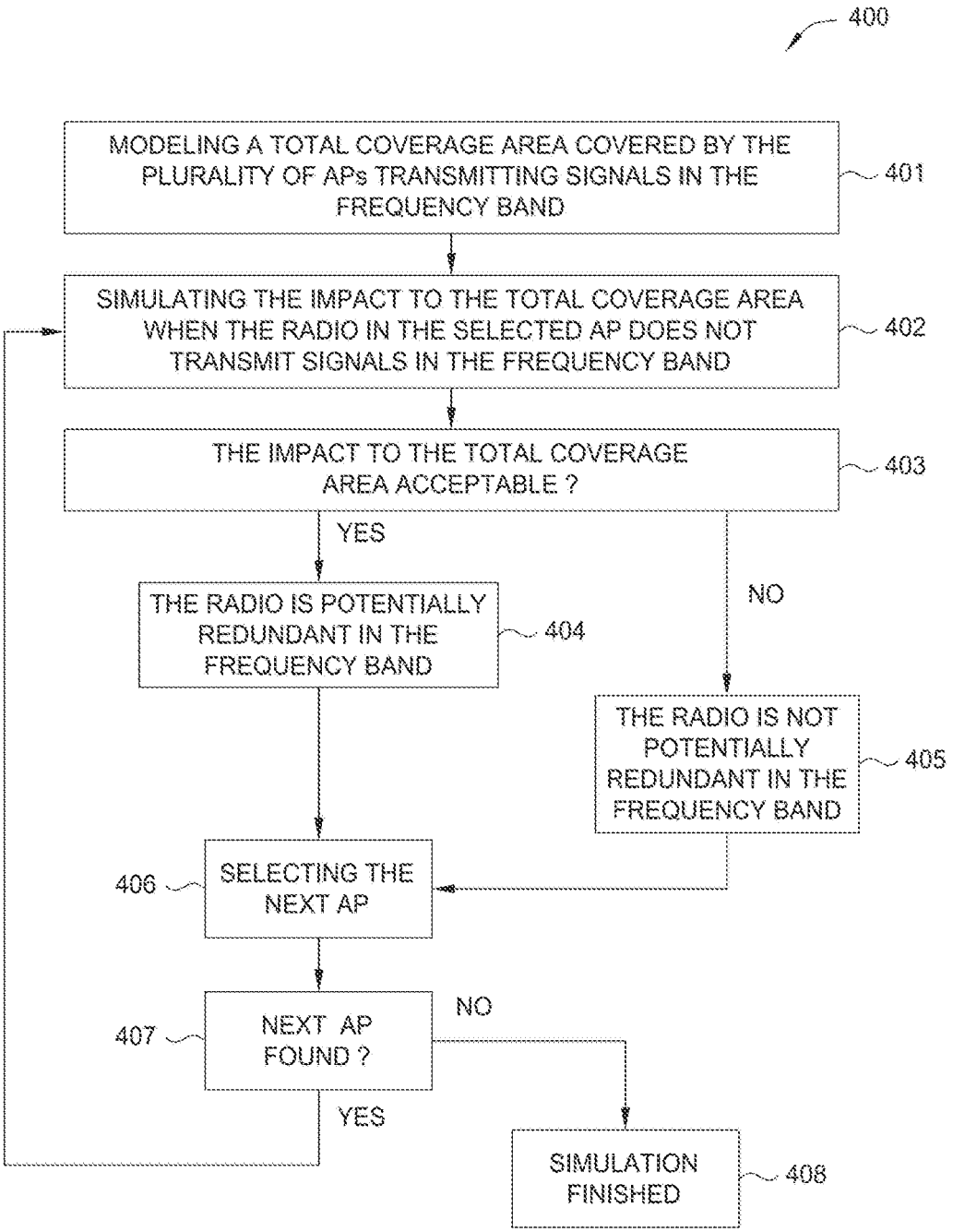
FIG. 4 illustrates a method to implement a coverage peak flattening algorithm, according to one embodiment herein.

FIG. 4 illustrates a method 400 to implement the coverage peak flattening algorithm described at block 304 of the method 300, according to one embodiment herein. At block 401, the coverage peak flattening simulator 208 models a total coverage area covered by the plurality of APs transmitting signals in the frequency band. The method 400 is described in parallel with FIGS. 5-8.

Figure 5:
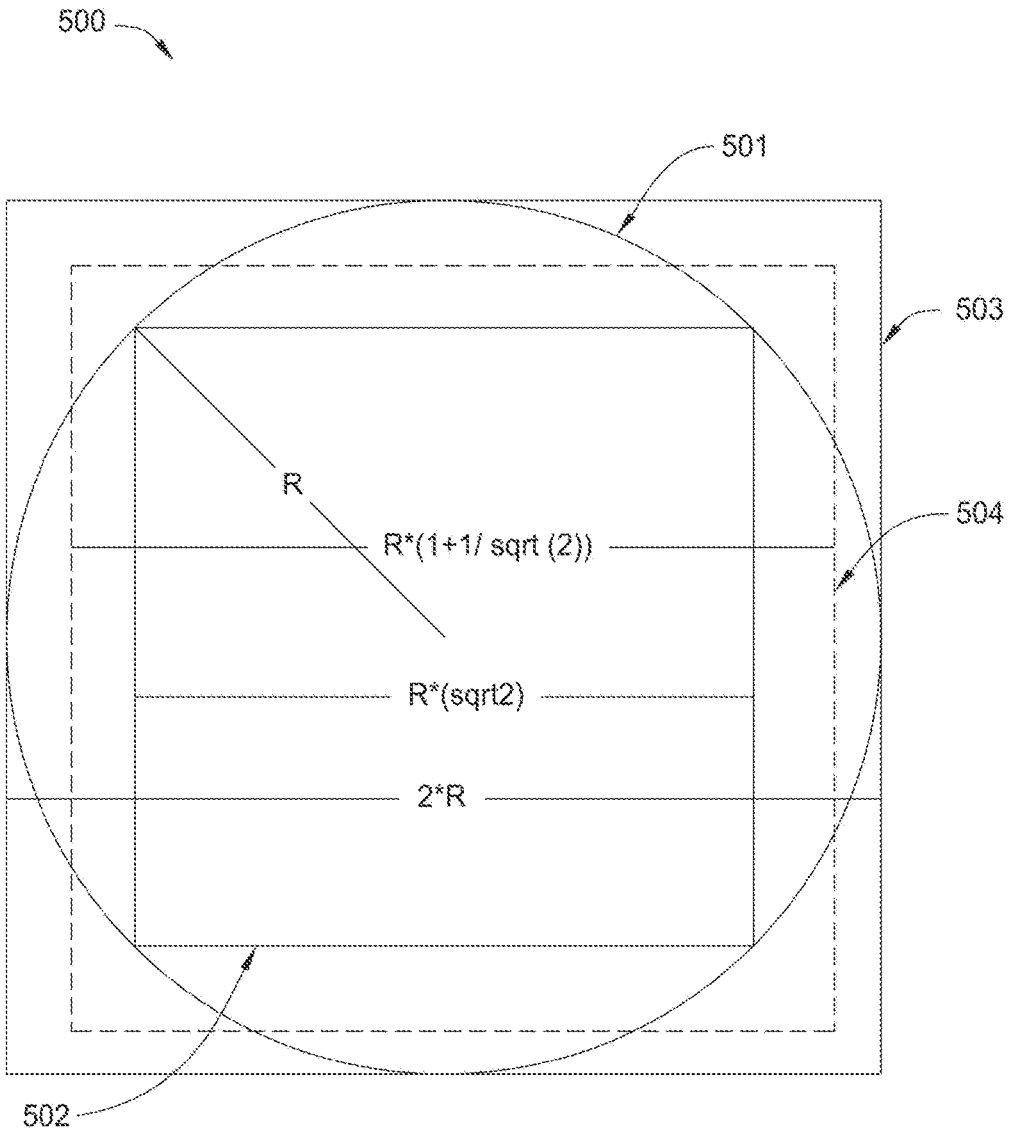
FIG. 5 illustrates a square based model to approximate an area covered by radios in a plurality of APs, according to one embodiment herein.

FIG. 5 shows a square based model of the total coverage area, according to one embodiment herein. As shown in FIG. 5, the circle 501 with a radius R indicates an actual total coverage area covered by an AP. The size of the actual total coverage area is $\pi*R^2$. While modeling the actual total coverage area by using the circle 501 provides an accurate model, doing so introduces intensive computational complexity when determining overlapping coverage areas of multiple APs inside the circle 501. Thus, in order to reduce the computational complexity, the coverage peak flattening simulator 208 models the actual total coverage area using a square based model which also provides a sufficiently accurate model.

In one embodiment, at block 401, the coverage peak flattening simulator 208 models the actual total coverage area using a square based model to approximate the actual total coverage area inside the circle 501. For example, there are three candidate square based models. The area indicated by the square 502 is the first candidate square based model. The side length of the square 502 is $\sqrt{2}*R$ and the size inside the square 502 is $2*R^2$. The area indicated by the square 503 is the second candidate square based model. The side length of the square 502 is 2*R and the size inside the square 502 is $4*R^2$. The area indicated by the square 504 (using dotted lines) is the third candidate square based model. The side length of the square 502 is $(1+1/\sqrt{2})R$ and the size inside the square 502 is $(1.5+\sqrt{2})R^2$. Among the three square based models, the size inside the third square based model, i.e., $(1.5+\sqrt{2})R^2$, is the closest to the size of the actual total coverage area, i.e., $\pi*R^2$. Thus, the coverage peak flattening simulator 208 uses the third square based model inside the square 504 to approximate the actual total coverage area inside the circle 501. In other embodiments, the coverage peak flattening simulator 208 can use the first or the second square based models depending on the requirement of the accuracy to approximate the actual total coverage area.

Figure 6:
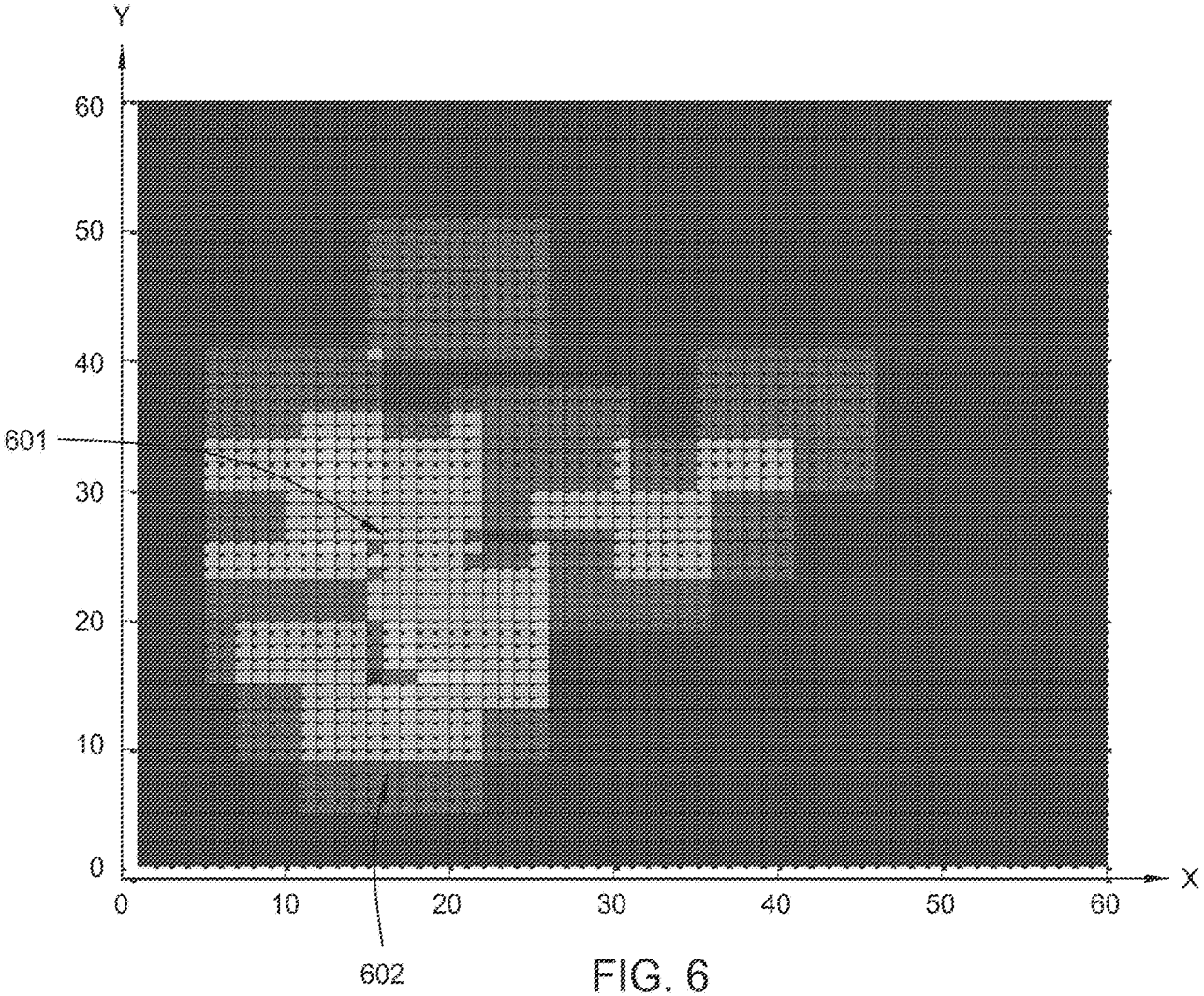
FIG. 6 illustrates an area covered by radios in a plurality of APs by using the square based model, according to one embodiment herein.

FIG. 6 illustrates the total coverage area by using the third square based model, according to one embodiment herein. In FIG. 6, the total coverage area is a 60 meter×60 meter square area. The 60 meter×60 meter square area is split into a plurality of grids. Each grid indicates a sub-area that is covered by one or more radios in the APs. The grids that are covered by multiple radios are considered as overlapping coverage areas. In one embodiment as shown in FIG. 6, the grid with a lighter color or shading is covered by a higher number of radios than the grid with a darker color or shading. For example, the grid indicated by arrow 601 is covered by 5 radios while the grid indicated by arrow 602 is covered by 2 radios.

Returning to method 400, at block 402, the coverage peak flattening simulator 208 simulates the impact to the total coverage area when the radio in the selected AP does not transmit signals in the frequency band. If the total coverage area satisfies a pre-defined coverage threshold, even after prohibiting the radio in the selected AP from transmitting signals in the frequency band then the coverage peak flattening simulator 208 predicts that the coverage area of the radio in the selected AP is sufficiently covered by at least one radio of its neighboring APs. On the other hand, if the radio in the selected AP is prohibited from transmitting signals in the frequency band and the total coverage area does not satisfy the pre-defined coverage threshold, the coverage peak flattening simulator 208 predicts that the coverage area of the radio in the selected AP is not sufficiently covered by at least one of its neighboring APs.

Figure 7:
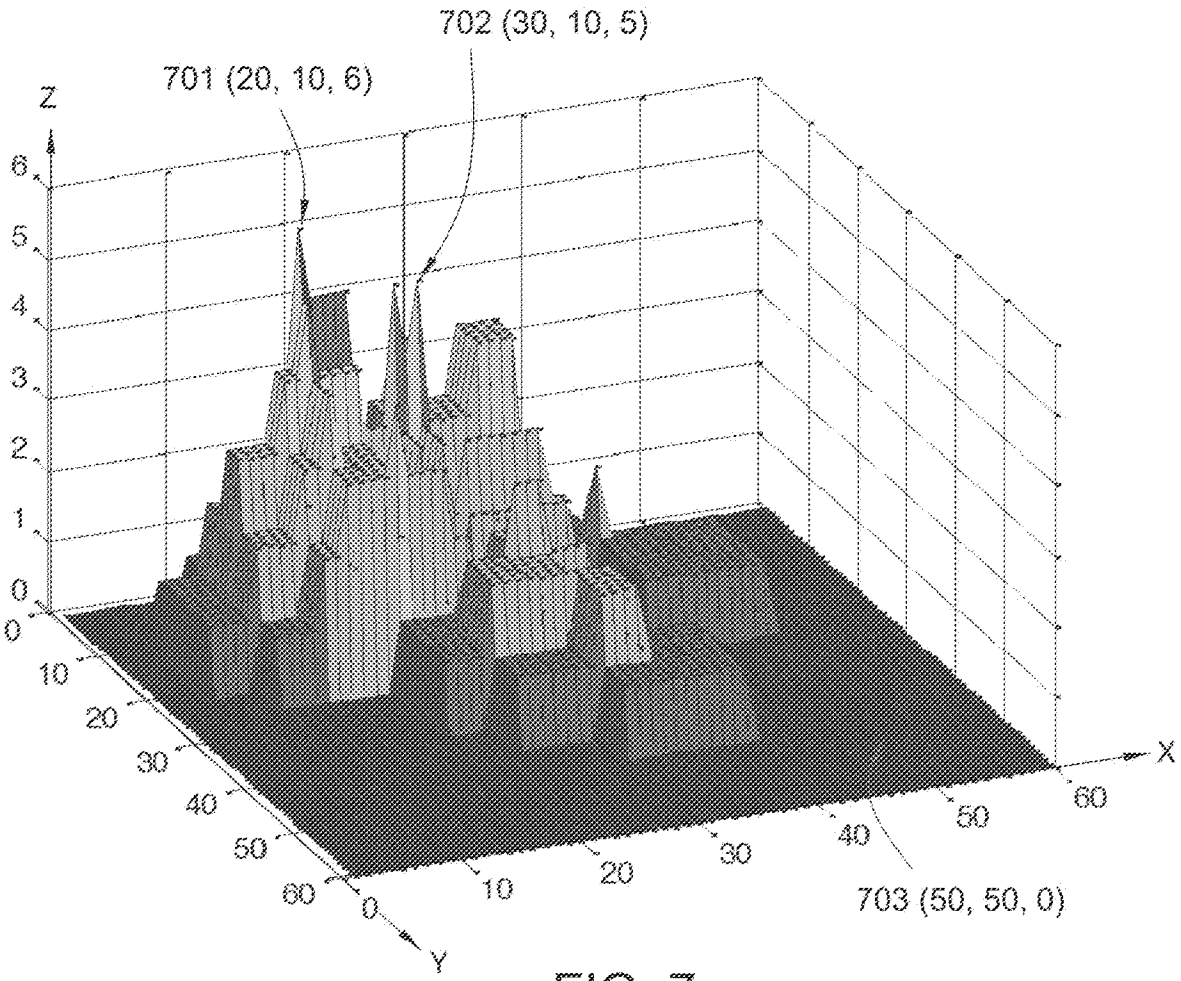
FIG. 7 illustrates a visualized simulation of the coverage peak flattening algorithm, according to one embodiment herein.

FIG. 7 illustrates a visualized simulation of the coverage peak flattening algorithm, according to one embodiment herein. In the simulations, the total coverage area is the 60 meter×60 meter square area as shown in FIG. 6. As shown in FIG. 7, a grid in the 60 meter×60 meter area is denoted by its coordinates in X axis and Y axis, and number of APs that cover the gird in a frequency band is denoted by its coordinate in Z axis. For example, 701 denotes a grid at (20, 10) which is covered by 6 APs in a frequency band, e.g., there are six radios in six APs that are transmitting signals in the 2.4 GHz frequency band. Thus, the coordinate at 701 is (20, 10, 6). Similarly, 702 denotes a grid at (30, 10) which is covered by 5 APs in the frequency band. Thus, the coordinate at 702 is (30, 10, 5). Also, 703 denotes a grid at (50, 50) which is not covered by any AP in the frequency band. Thus, the coordinate at 703 is (50, 50, 0). The total coverage area is reduced whenever one of the coordinates which was previously covered by at least one AP is no longer covered by any AP in the simulation.

In one embodiment, the simulation of coverage peak flattening algorithm starts from the highest peak 701 in the simulation and an AP that covers grid 701 which has the highest density value. In another example, the simulation of coverage peak flattening algorithm may select an AP that covers grid 701 and has the least load among the 6 APs that cover grid 701. In the simulation, the radio in the selected AP that covers grid 701 is prohibited from transmitting signals in the frequency band or is prohibited from operating on its assigned channel to serve clients. For example, the XOR radio in the selected AP that covers grid 701 is prohibited from transmitting signals in the 2.4 GHz frequency band. The simulation results determine whether the total coverage area is changed.

Once the simulation for the selected AP is finished, at block 403, the coverage peak flattening simulator 208 determines whether the impact to the total coverage area is acceptable. In one embodiment, if the total coverage area satisfies the coverage threshold, the impact to the total coverage area is considered as acceptable. Otherwise, the impact to the total coverage area is considered as not acceptable. For example, the coverage threshold can be a tolerance factor T, which indicates that the current total coverage area after prohibiting the radio in the selected AP from transmitting signals in the frequency band is $\tau$%, e.g., 90%, of the geographic area of the original total coverage area before prohibiting the radio in the selected AP from transmitting signals in the frequency band. After prohibiting the radio in the selected AP from transmitting signals in the frequency band, the current coverage area is the area covered by at least one radio in one of the APs that are continuing to transmit signals in the frequency band.

If the impact to the total coverage area is not acceptable at block 403, e.g., the current total coverage area is below $\tau$% of the original total coverage area, the method 400 proceeds to block 405 where the coverage peak flattening simulator 208 determines that radio in the selected AP is not potentially redundant in the frequency band. In one embodiment, the AP with the highest density value does not have a redundant radio, the coverage peak flattening simulator 208 continues to select another AP.

On the other hand, if the impact to the total coverage area is acceptable, e.g., the current total coverage area is at least $\tau$% of the original total coverage area, at block 404, the coverage peak flattening simulator 208 determines that the radio in the selected AP is potentially redundant in the frequency band. For example, if the impact to the total coverage area is acceptable, the radio in the selected AP that covers grid 701 is determined as potentially redundant and removed from the simulation. That is, after one simulation, the coordinate at 701 is changed from (20, 10, 6) to (20, 10, 5).

In one embodiment, the coverage peak flattening algorithm can be implemented recursively. As shown in FIG. 4, after determining whether the radio in the selected AP is potentially redundant at block 404 or 405, the method 400 proceeds to block 406. At block 406, the coverage peak flattening simulator 208 selects the next candidate AP. In one embodiment, the coverage peak flattening simulator 208 selects the candidate AP with the second highest density value (peak).

At block 407, the coverage peak flattening simulator 208 determines whether the next candidate AP is found. If the answer at block 407 is "Yes", then the method 400 in FIG. 4 returns to block 402 to implement the coverage peak flattening algorithm for the next candidate AP and so on. If the answer at block 407 is "No", the method 400 proceeds to block 408 to finish the simulation.

In one embodiment, the simulation runs recursively until the impact to the total coverage area is not acceptable. In each iteration of the simulation, a radio in a selected AP that covers a grid in the 60 meter×60 meter area is prohibited from transmitting signals in a frequency band or is prohibited from operating on its assigned channel to serve clients. When the coverage peak flattening algorithm is implemented multiple times until the impact to the total coverage area is not acceptable, e.g., until the coverage threshold is reached, multiple APs may be determined as potentially redundant and are removed from the simulation. Accordingly, the coordinates at different grids may be changed when the simulation is ended.

Figure 8:
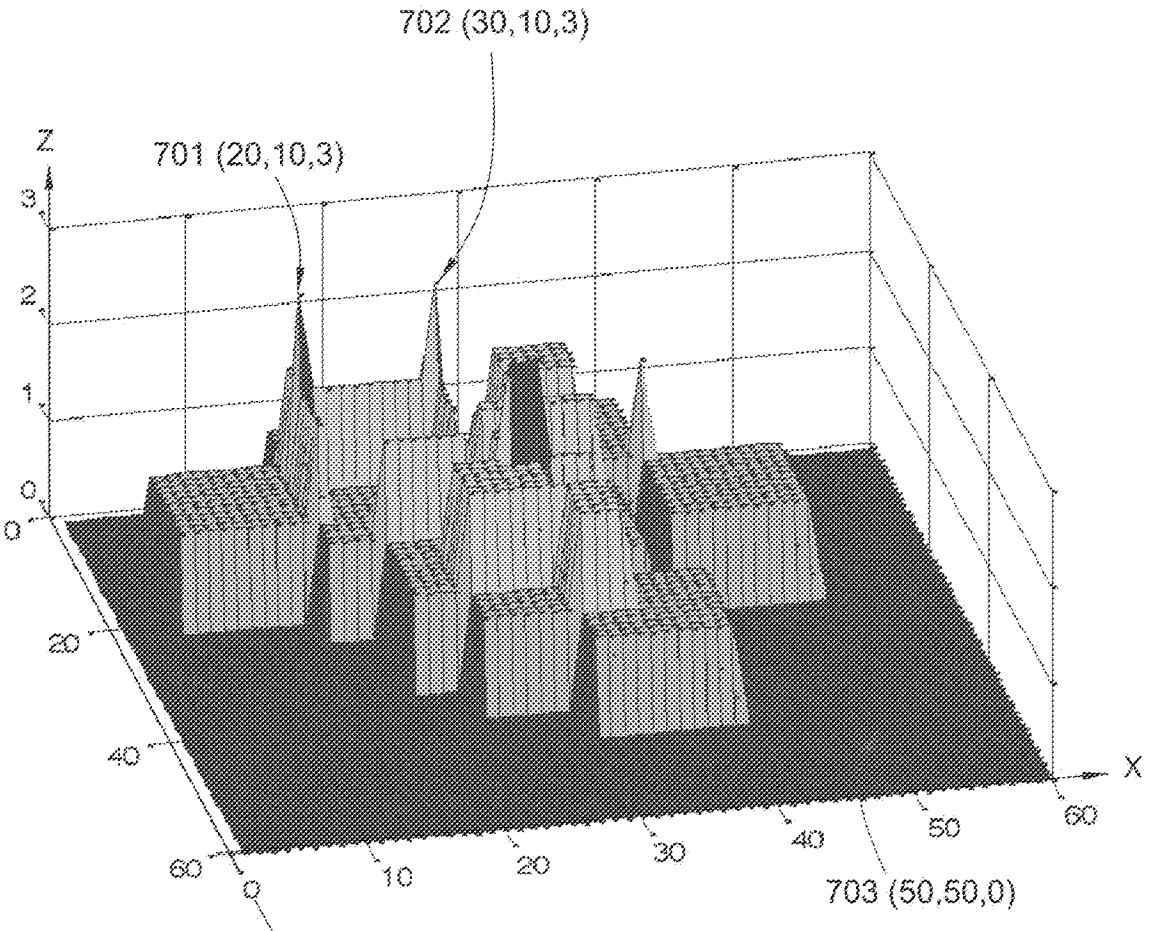
FIG. 8 illustrates simulation results of the coverage peak flattening algorithm, according to one embodiment herein.

FIG. 8 illustrates the simulation results of the coverage peak flattening algorithm, according to one embodiment herein. As shown in FIG. 8, when the simulation is implemented multiple times until the coverage threshold is reached, the coordinate at 701 is (20, 10, 3), which indicates that 3 APs cover grid 701 while satisfying the acceptable total coverage area, i.e., 3 APs among the original 6 APs that cover grid 701 are determined as potentially redundant. Also, when the simulation is implemented multiple times until the threshold is reached, the coordinate at 702 is (30, 10, 3) which indicates that 3 APs cover grid 702 while satisfying the acceptable total coverage area, i.e., 2 APs among the original 5 APs that cover grid 702 are determined as potentially redundant. Thus, the number of APs that cover a same grid in the 60 meter×60 meter area is reduced, i.e., the density value (peak) is flattened. Using the coverage peak flattening algorithm recursively, the coverage peak flattening simulator 208 can determine which APs include potentially redundant radios based on the simulation results.

FIGS. 4-8 only show one embodiment herein. In another embodiment, a separate computing system can model the area and performs the simulation. The separate computing system can transmit the simulation results to the network controller 101 to determine whether the selected AP has a redundant radio in the frequency band.

Figure 9:
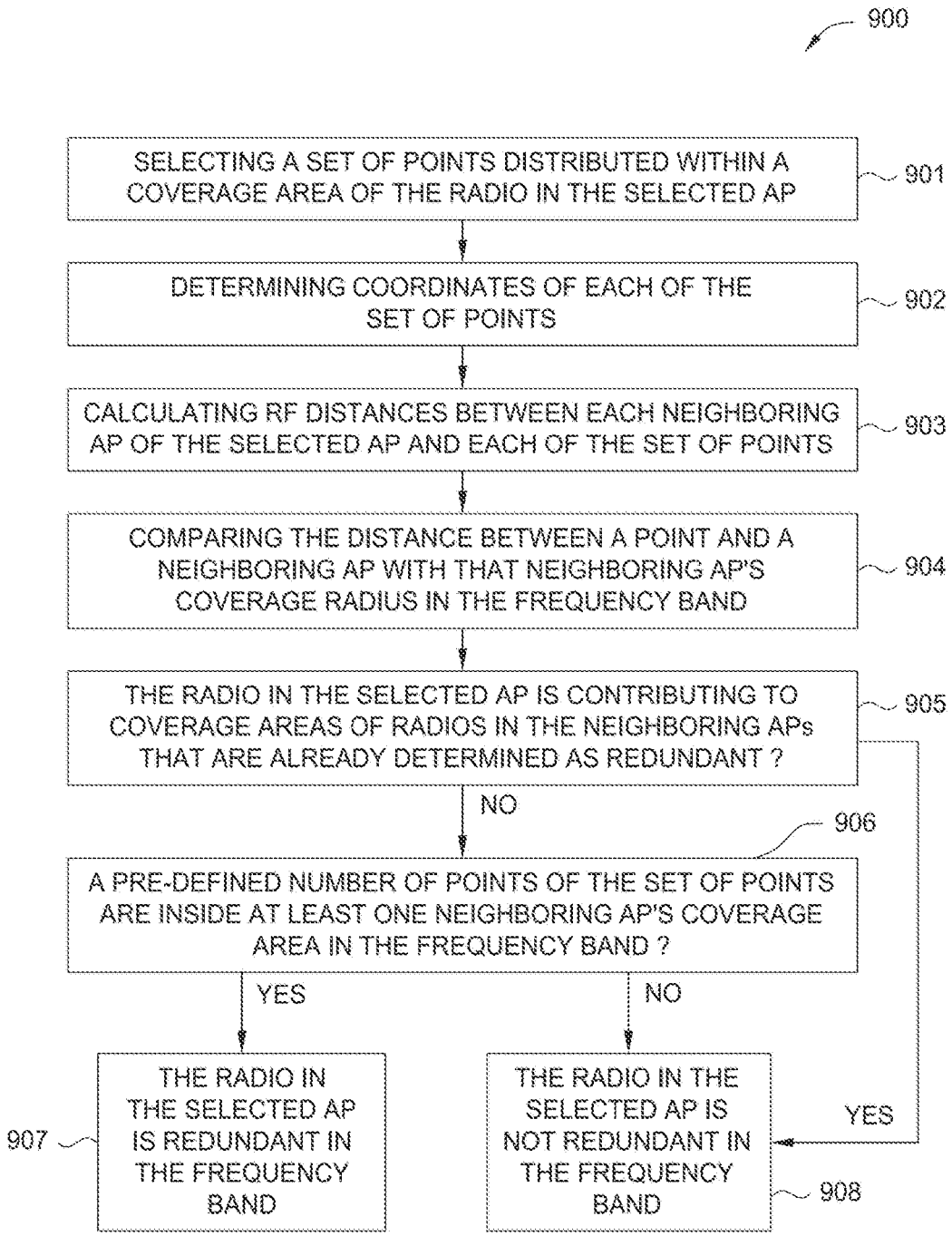
FIG. 9 illustrates a method to implement a multi-point check algorithm, according to one embodiment herein.

FIG. 9 illustrates a method 900 for performing the multi-point check algorithm as described at block 307 of the method 300, according to one embodiment herein. At block 901, the multi-point checker 209 selects a set of points distributed within a coverage area of the radio in the selected AP.

Figure 10:
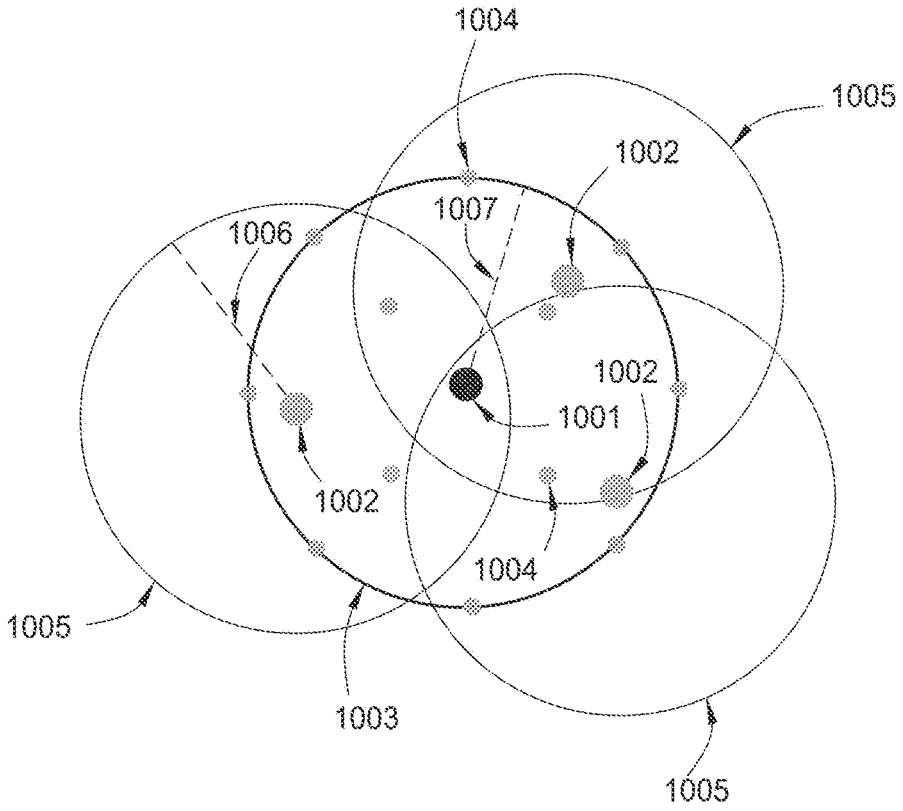
FIG. 10 illustrates a diagram of the multi-point check algorithm, according to one embodiment herein.

In one embodiment, at block 901, the multi-point checker 209 selects a set of 13 points. FIG. 10 illustrates the multi-point check algorithm using a 13-point distribution (including the origin), according to one embodiment herein. As shown, the selected AP 1001 is located at the origin with the coordinate (0, 0) and another three neighboring APs 1002 are located nearby. A coverage circle 1003 indicates the coverage area of the radio (e.g., the XOR radio) in the selected AP 1001 in the frequency band (e.g., the 2.4 GHz frequency band). Similarly, the three coverage circles for the neighboring APs 1002 are denoted as 1005, which indicate the coverage areas of the radios in the three neighboring APs in the same frequency band. The multi-point checker 209 selects the origin and also selects another 12 points in the coverage circle 1003. This includes 8 points uniformly distributed on the coverage circle 1003 and another 4 points uniformly distributed inside the coverage circle 1003. For simplicity of illustration, only two of the 12 points are denoted as 1004.

Once the set of points is selected, at block 902, the multi-point checker 209 determines coordinates of each of the set of points. In FIG. 10, the multi-point checker 209 determines the coordinates of each of the 12 points 1004 relative to the origin (the origin's coordinate is known as (0,0)). The multi-point checker 209 calculates the coordinates of each of the 12 points 1004 relative to the origin based on the distances of each of the 12 points 1004 relative to the origin and the uniform distribution of the 12 points. For example, the coordinates of the 8 points uniformly distributed on the coverage circle 1003 can be (0, r), $$\left(\frac{1}{\sqrt{2}}r, \frac{1}{\sqrt{2}}r\right),$$

$(r, 0)$, $$\left(\frac{1}{\sqrt{2}}r, -\frac{1}{\sqrt{2}}r\right),$$

$(0, -r)$, $$\left(-\frac{1}{\sqrt{2}}r, -\frac{1}{\sqrt{2}}r\right),$$

$(-r, 0)$, $$\left(-\frac{1}{\sqrt{2}}r, \frac{1}{\sqrt{2}}r\right),$$

and the coordinates of the 4 points uniformly distributed inside the coverage circle 1003 can be $$\left(\frac{1}{2}r, \frac{1}{2}r\right), \left(\frac{1}{2}r, -\frac{1}{2}r\right), \left(-\frac{1}{2}r, -\frac{1}{2}r\right), \left(\frac{1}{2}r, -\frac{1}{2}r\right),$$

where r is the radius of the selected AP 1001's coverage circle 1003, denoted as 1007.

Returning to the method 900, at block 903, the multi-point checker 209 calculates RF distances between each neighboring AP of the selected AP and each of the set of points. In one embodiment, RF distances refer to distances that are computed solely based on the measured path loss between APs. RF distances do not necessarily correspond to the physical location distances. For example, the presence of a wall between two APs will cause a further RF distance between the two APs than the physical distance. In some embodiments of the present disclosure, using RF distances is preferred to using the physical distances.

As shown in FIG. 10, the multi-point checker 209 calculates the distances between each neighboring AP 1002 and each of the 13 points (the 12 points 1004 and the origin), based on the coordinates of each neighboring AP 1002 and the coordinates of each of the 13 points. In one embodiment, the RF constellation calculator 206 calculates the coordinates of each neighboring AP 1002 relative to the origin as described above. For each of the three neighboring APs 1002, the multi-point checker 209 calculates the distances between the neighboring AP 1002 and each of the 13 points.

Once distances between each neighboring AP of the selected AP and each of the set of points are calculated, at block 904, the multi-point checker 209 compares the distance between a point and a neighboring AP with that neighboring AP's coverage radius in the frequency band. As shown in FIG. 10, the multi-point checker 209 compares the distance between a point 1004 and a neighboring AP 1002 with that neighboring AP 1002's coverage radius in the frequency band. A neighboring AP 1002's coverage radius is the radius of that neighboring AP 1002's coverage circle 1005, denoted as 1006.

Based on the comparisons in block 904, at block 905, the multi-point checker 209 determines whether the radio in the selected AP is contributing to coverage areas of one or more radios in neighboring APs that are already determined as redundant. In one embodiment, if a radio in a neighboring AP is already marked as redundant, the multi-point checker 209 determines whether one or more points of the set of points are inside the coverage area of the redundant radio in the neighboring AP. If so, the radio in the selected AP contributes to the coverage area of the redundant radio in neighboring APs ("YES" at block 905). For example, it is assumed that the radio in the leftmost neighboring AP 1002 was previously determined as redundant and does not transmit signals. The multi-point checker 209 determines whether one or more points of the set of points 1004 are inside the leftmost circle 1005 (the original coverage area of the leftmost neighboring AP 1002 before it is prohibited from transmitting signals). As shown in FIG. 10, there are 6 points 1004 inside the leftmost circle 1005, thus, the multi-point checker 209 determines that the radio 1001 is contributing to the coverage area of the redundant radio in the leftmost neighboring AP 1002. Then the method 900 proceeds to block 908. At block 908, the multi-point checker 209 determines that the radio in the selected AP is not redundant in the frequency band. In this way, the multi-point checker 209 avoids potential coverage holes, e.g., one or more radios covering the same area are determined as redundant such that there are some areas previously covered are not covered anymore.

In one embedment, at block 905, the multi-point checker 209 also identifies which neighboring AP includes which of the set of points in the neighboring AP's coverage area. In this way, the multi-point checker 209 identifies the one or more neighboring APs that contribute coverage to the coverage area of the radio in the selected AP.

If the answer at block 905 is "NO", the method proceeds to block 906. At block 906, the multi-point checker 209 determines whether a pre-defined number of points of the set of points are inside at least one neighboring AP's coverage area in the frequency band. Referring to FIG. 10, if the distance between a point 1004 and a neighboring AP 1002 is less than the coverage radius 1006 of that neighboring AP 1002 in the frequency band, the multi-point checker 209 determines that the point 1004 is inside the coverage area of that neighboring AP 1002 in the frequency band. In this way, the multi-point checker 209 determines whether a pre-defined number of the 13 points are inside one or more neighboring APs 1002's coverage area in the frequency band.

In one embodiment, the multi-point checker 209 determines whether all the points of the set of points are inside at least one neighboring AP's coverage area in the frequency band. In another embodiment, the multi-point checker 209 determines whether a certain number (not all) of points of the set of points are inside at least one neighboring AP's coverage area in the frequency band. That is, the multi-point checker 209 checks all the points and can nonetheless determine whether a threshold number (but not all) of the set of points are inside a neighboring AP's coverage area in the frequency band. In another embodiment, the multi-point checker 209 uses a coverage overlap factor (COF) to indicate how well the circle is covered, e.g., fully covered or almost fully covered. In one embodiment, the COF is defined as: (percentage of points in circle fully covered)+ $\alpha\times$(percentage of points in circle covered with an additional margin based on their proximity to the origin), where a is a coefficient and $0<\alpha<1$.

If the answer at block 906 is "YES", at block 907, the multi-point checker 209 determines that the radio in the selected AP is redundant in the frequency band, i.e., the selected candidate AP has a redundant radio in the frequency band. For example, as shown in FIG. 10, all the 13 points 1004 are inside the coverage circle 1005 of at least one neighboring AP 1002. The coverage area of the selected AP 1001 in the frequency band is considered as sufficiently covered by one or more of its neighboring APs 1002. Thus, the radio in the selected AP 1001 transmitting signals in the frequency band is determined as redundant in the frequency band.

If the answer at block 906 is "NO", at block 908, the multi-point checker 209 determines that the radio in the selected AP is not redundant in the frequency band. For example, if a pre-defined number of the 13 points in FIG. 10 are not inside at least one neighboring AP 1002's coverage circle 1005, the selected AP 1001's coverage area in the frequency band is not considered as sufficiently covered by one or more of its neighboring APs 1002. Thus, the multi-point checker 209 determines that the radio in the selected AP 1001 is not redundant in the frequency band.

In one embodiment, after determining whether the radio in the selected AP is redundant, the multi-point checker 209 implements the multi-point check algorithm to determine whether the next candidate AP has a redundant radio and so on. For example, after the coverage peak flattening simulator 208 performs the coverage peak flattening algorithm recursively, the coverage peak flattening simulator 208 can provide a list of potentially redundant radios to the multi-point checker 209. The multi-point checker 209 can perform the multi-point check algorithm on each radio in the list, as understood by an ordinary person in the art.

FIG. 10 only illustrates one embodiment of the multi-point check algorithm. In other embodiments, a different number of points may be used. In other embodiments, the multiple points may be distributed at different locations on or inside the selected AP's coverage circle. In other embodiments, the coverage circles may indicate different coverage areas, e.g., the XOR radios' coverage area in the 5 GHz frequency band.

Figure 11:
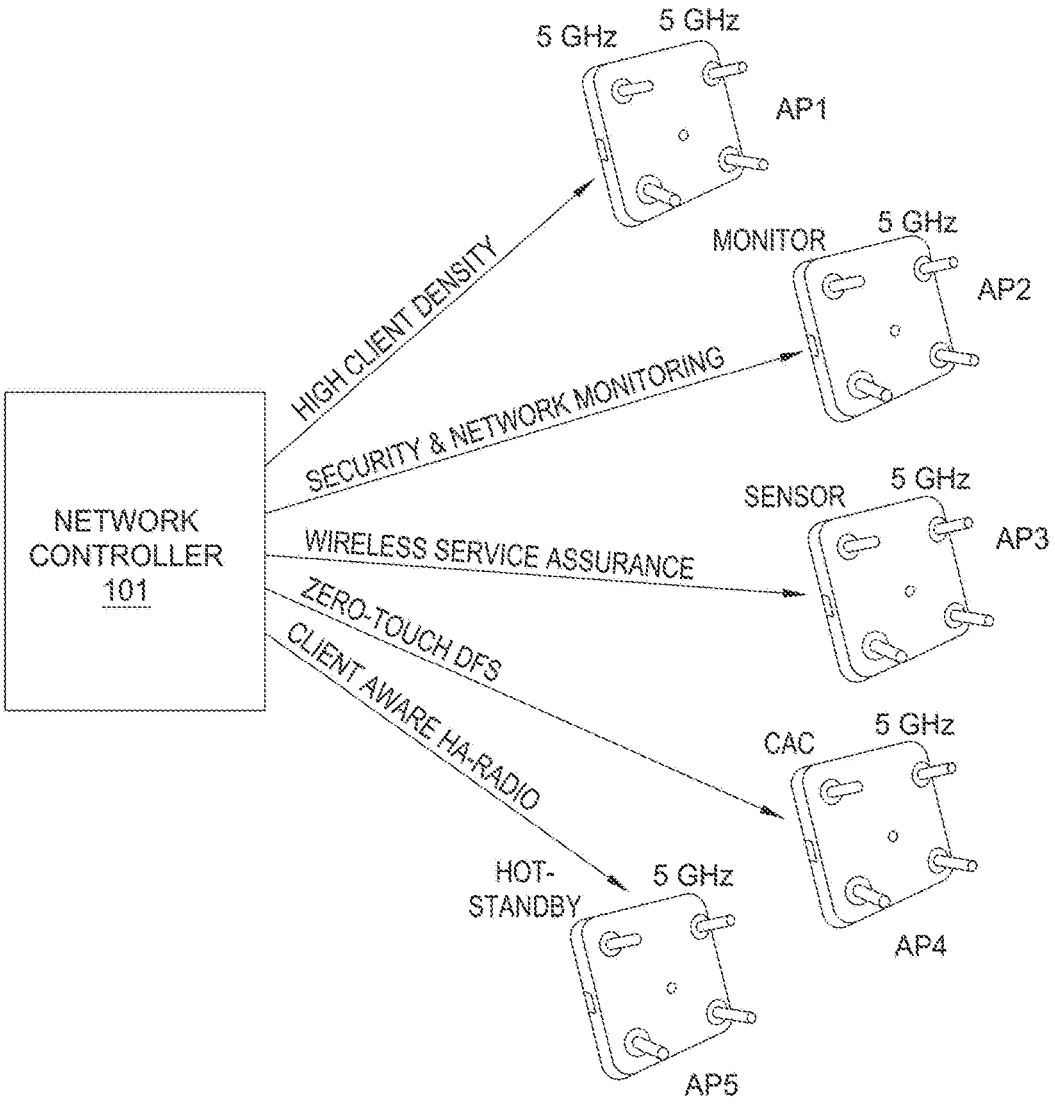
FIG. 11 illustrates a network controller controlling multiple radios to operate in different modes, according to one embodiment herein.

FIG. 11 illustrates that the network controller 101 controls multiple redundant XOR radios in 2.4 GHz frequency band to operate in different operation modes, according to one embodiment herein. In FIG. 11, the XOR radios in AP1-AP5 are determined as redundant radios in 2.4 GHz frequency band. RRM 203 of the network controller 101 sends different configuration messages to different redundant XOR radios to instruct the redundant XOR radios to operate in different modes. For examples, the XOR radio in AP1 is switched to transmit signals in 5 GHz frequency band due to high client density in 5 GHz frequency band. The XOR radio in AP2 is changed to the non-client serving role to perform security and network monitoring. The XOR radio in AP3 is operated as a spectrum sensor to provide wireless service assurance service. The XOR radio in AP4 is operated to provide Channel Availability Check (CAC) for Zero-Touch Dynamic Frequency Selection (DFS) service. The XOR radio in AP5 is operated as Client-Aware high availability (HA) Radio in a hot-standby mode. In other embodiments, the network controller 101 can control the redundant XOR radios to operate in other modes, as understood by an ordinary person in the art. Thus, the network controller 101 can dynamic configure redundant XOR radios based on evaluations of RF conditions, available channel sets and client density in the network.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a standalone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A device, comprising:

a processor;

a memory containing a program that, when executed on the processor, performs an operation, the operation comprising:

simulating, at a network controller, a coverage area model for an area covered by a plurality of access points controlled by the network controller and operating in a frequency band:

when a radio in a first access point of the plurality of access points does not operate in the frequency band, determining, using the coverage area model, whether the area covered by at least one other radio in the plurality of access points satisfies a predetermined coverage threshold for the area covered by the plurality of access points;

upon determining that the area covered by at least one other radio in the plurality of access points satisfies the predetermined coverage threshold, determining, at the network controller, that the radio in the first access point is redundant; and upon determining that the radio in the first access point is redundant, prohibiting, via the network controller, the radio in the first access point from operating in the frequency band.

2. The device of claim 1, wherein determining that the radio in the first access point is redundant comprises:

selecting a set of points distributed within a coverage area of the radio in the first access point;

calculating distances between each of a plurality of neighboring access points of the first access point and each of the set of points, wherein the plurality of neighboring access points are in direct communication with the radio in the first access point; and determining that a pre-defined number of the set of points are inside the coverage area of at least one of the plurality of neighboring access points based on the calculated distances.

3. The device of claim 2, wherein determining that the radio in the first access point is redundant comprises:

determining that the radio in the first access point is not contributing to coverage areas of one or more radios in the plurality of neighboring access points that are already determined as redundant.

4. The device of claim 2, wherein determining that the radio in the first access point is redundant comprises:

identifying one or more radios in the plurality of neighboring access points that contribute coverage to the coverage area of the radio in the first access point.

5. The device of claim 1, wherein the radio in the first access point comprises a XOR radio configured to dynamically switch between the frequency band and a different frequency band.

6. The device of claim 1, wherein the predetermined coverage threshold comprises a percentage of a size of the area.

7. The device of claim 1, wherein the operation further comprises:

when a radio in a second access point of the plurality of access points does not operate in the frequency band, simulating whether the area covered by at least one other radio in the plurality of access points satisfies the predetermined coverage threshold; and upon simulating that the area covered by at least one other radio in the plurality of access points does not satisfy the predetermined coverage threshold, determining that the radio in the second access point is not redundant.

8. A computer program product, comprising:

a non-transitory computer-readable storage medium having computer readable program code embodied therewith, wherein the computer readable program code is configured to:

simulate, at a network controller, a coverage area model for an area covered by a plurality of access points operating in a frequency band:

when a radio in a first access point of the plurality of access points does not operate in the frequency band, determining, using the coverage area model, whether the area covered by at least one other radio in the plurality of access points satisfies a predetermined coverage threshold for the area covered by the plurality of access points;

upon determining that the area covered by at least one other radio in the plurality of access points satisfies the predetermined coverage threshold, determine, at the network controller, that the radio in the first access point is redundant; and upon determining that the radio in the first access point is redundant, prohibit, via the network controller, the radio in the first access point from operating in the frequency band.

9. The computer program product of claim 8, wherein the computer readable program code is further configured to:

select a set of points distributed within a coverage area of the radio in the first access point;

calculate distances between each of a plurality of neighboring access points of the first access point and each of the set of points, wherein the plurality of neighboring access points are in direct communication with the first access point; and determine that a pre-defined number of the set of points are inside the coverage area of at least one of the plurality of neighboring access points based on the calculated distances.

10. The computer program product of claim 9, wherein the computer readable program code is further configured to:

determine that the radio in the first access point is not contributing to coverage areas of one or more radios in the plurality of neighboring access points that are already determined as redundant.

11. The computer program product of claim 9, wherein the computer readable program code is further configured to:

identify one or more radios in the plurality of neighboring access points that contribute coverage to the coverage area of the radio in the first access point.

12. The computer program product of claim 8, wherein the radio in the first access point comprises a XOR radio configured to dynamically switch between the frequency band and a different frequency band.

13. The computer program product of claim 8, wherein the predetermined coverage threshold comprises a percentage of a size of the area.

14. The computer program product of claim 8, wherein the computer readable program code is further configured to:

when a radio in a second access point of the plurality of access points does not operate in the frequency band, simulate whether the area covered by at least one other radio in the plurality of access points satisfies the predetermined coverage threshold; and upon simulating that the area covered by at least one other radio in the plurality of access points does not satisfy the predetermined coverage threshold, determine that the radio in the second access point is not redundant.

15. A method, comprising:

simulating, at a network controller, a coverage area model for an area covered by a plurality of access points controlled by the network controller and operating in a frequency band:

when a radio in a first access point of the plurality of access points does not operate in the frequency band, simulating whether the area covered by at least one other radio in the plurality of access points satisfies a predetermined coverage threshold;

upon simulating that the area covered by at least one other radio in the plurality of access points satisfies the predetermined coverage threshold, determining that the radio in the first access point is redundant; and upon determining that the radio in the first access point is redundant, prohibiting the radio in the first access point from operating in the frequency band.

16. The method of claim 15, wherein determining that the radio in the first access point is redundant comprises:

selecting a set of points distributed within a coverage area of the radio in the first access point;

calculating distances between each of a plurality of neighboring access points of the first access point and each of the set of points, wherein the plurality of neighboring access points are in direct communication with the first access point; and determining that a pre-defined number of the set of points are inside the coverage area of at least one of the plurality of neighboring access points based on the calculated distances.

17. The method of claim 16, wherein determining that the radio in the first access point is redundant comprises:

determining that the radio in the first access point is not contributing to coverage areas of one or more radios in the plurality of neighboring access points that are already determined as redundant.

18. The method of claim 16, wherein determining that the radio in the first access point is redundant comprises:

identifying one or more radios in the plurality of neighboring access points that contribute coverage to the coverage area of the radio in the first access point.

19. The method of claim 15, wherein the radio in the first access point comprises a XOR radio configured to dynamically switch between the frequency band and a different frequency band.

20. The method of claim 15, wherein the predetermined coverage threshold comprises a percentage of a size of the area.

*21. A method for reducing co-channel interference in a wireless network, the method comprising:*

*accessing inter-radio measurement data collected by a plurality of wireless access points, wherein the inter-radio measurement data relates to observations of radio frequency (RF) signals transmitted between radios of the plurality of access points,*

*wherein one or more of the plurality of wireless access points comprises a first radio operative to transmit wireless signals in a first frequency band and a second radio operative to transmit wireless signals in a second frequency band;*

*determining from the inter-radio measurement data whether a first wireless access point of the wireless access points is redundant in relation to the second frequency band based on RF coverage provided by one or more neighboring access points;*

*if the first wireless access point is determined to be redundant, selecting for the second radio of the first wireless access point an operation mode from a plurality of operation modes; and*

*transmitting a command to the first wireless access point to configure the second radio of the first wireless access point to operate in the selected operation mode.*

*22. The method of claim 21, wherein the selected operation mode of the plurality of operation modes is a non-client serving role.*

*23. The method of claim 22, wherein the non-client serving role comprises a monitoring function.*

*24. The method of claim 21, wherein determining whether the first wireless access point of the wireless access points is redundant comprises:*

*selecting a set of points distributed within a coverage area of the second radio in the first access point;*

*calculating, based on the inter-radio measurement data, distances between each of a plurality of neighboring access points of the first access point and each of the set of points, wherein the plurality of neighboring access points are in direct communication with the second radio of the first access point; and*

*determining that a pre-defined number of the set of points are inside the coverage area of at least one of the plurality of neighboring access points based on the calculated distances.*

*25. The method of claim 21, wherein determining whether the first wireless access point of the wireless access points is redundant comprises:*

*identifying a change to a total coverage area provided by the plurality of access points, if the second radio is prohibited from transmitting signals in the second frequency band; and*

*determining that the first wireless access point is redundant if the change is below a threshold value.*

*26. The method of claim 21, wherein determining whether the first wireless access point of the wireless access points is redundant comprises:*

*calculating respective locations of neighboring wireless access points of the first access point; and*

*determining, based on the locations, that a coverage area of the second radio in the second frequency band is covered by at least one of the respective neighboring access points of the selected access point.*

*27. The method of claim 21, wherein the second radio of the first wireless access point comprises a XOR radio configured to dynamically switch between the first frequency band and the second frequency band.*

*28. The method of claim 21, wherein the first frequency band comprises a 5 GHz Wi-Fi frequency band and the second frequency band comprises a 2.4 GHz Wi-Fi frequency band.*

*29. The method of claim 21, wherein selection of the operation mode is based on evaluation of one or more of RF conditions, available channel sets and client density in the network.*

*30. The method of claim 21, wherein the selected operation mode comprises operating the second radio as an access point in the first frequency band.*

*31. The method of claim 30, further comprising:*

*including the second radio of the first wireless access point in a Dynamic Channel Assignment process for the first frequency band with the plurality of wireless access points.*

*32. The method of claim 21, wherein the selected operation mode comprises operating in a monitor mode in either or both of the first and second frequency bands.*

*33. The method of claim 21, wherein the selected operation mode prevents the second radio from transmitting RF signals in the second frequency band.*

*34. An apparatus comprising:*

*a processor; and*

*a memory, the memory comprising a radio resource management component operative when executed by the processor to:*

*access inter-radio measurement data collected by a plurality of wireless access points, wherein the inter-radio measurement data relates to observations of radio frequency (RF) signals transmitted between radios of the plurality of access points,*

*wherein one or more of the plurality of wireless access points comprises a first radio operative to transmit wireless signals in a first frequency band and a second radio operative to transmit wireless signals in a second frequency band;*

*determine from the inter-radio measurement data whether a first wireless access point of the wireless access points is redundant in relation to the second frequency band based on RF coverage provided by one or more neighboring access points;*

*if the first wireless access point is determined to be redundant, select for the second radio an operation mode from a plurality of operation modes; and*

*transmit a command to the first wireless access point to configure the second radio of the first wireless access point to operate in the selected operation mode.*

*35. The apparatus of claim 34, wherein the selected operation mode of the plurality of operation modes is a non-client serving role.*

*36. The apparatus of claim 35, wherein the non-client serving role comprises a monitoring function.*

*37. The apparatus of claim 34, wherein determining whether the first wireless access point of the wireless access points is redundant comprises:*

*selecting a set of points distributed within a coverage area of the second radio in the first access point;*

*calculating, based on the inter-radio measurement data, distances between each of a plurality of neighboring access points of the first access point and each of the set of points, wherein the plurality of neighboring access points are in direct communication with the second radio of the first access point; and*

*determining that a pre-defined number of the set of points are inside the coverage area of at least one of the plurality of neighboring access points based on the calculated distances.*

*38. The apparatus of claim 34, wherein determining whether the first wireless access point of the wireless access points is redundant comprises:*

*identifying a change to a total coverage area provided by the plurality of access points, if the second radio is prohibited from transmitting signals in the second frequency band; and*

*determining that the first wireless access point is redundant if the change is below a threshold value.*

*39. The apparatus of claim 34, wherein determining whether the first wireless access point of the wireless access points is redundant comprises:*

*calculating respective locations of neighboring wireless access points of the first access point; and*

*determining, based on the locations, that a coverage area of the second radio in the second frequency band is covered by at least one of the respective neighboring access points of the selected access point.*

*40. The apparatus of claim 34, wherein the second radio of the first wireless access point comprises a XOR radio configured to dynamically switch between the first frequency band and the second frequency band.*

*41. The apparatus of claim 34, wherein the first frequency band comprises a 5 GHz Wi-Fi frequency band and the second frequency band comprises a 2.4 GHz Wi-Fi frequency band.*

*42. The apparatus of claim 34, wherein selection of the operation mode is based on evaluation of one or more of RF conditions, available channel sets and client density in the network.*

*43. The apparatus of claim 34, wherein the selected operation mode comprises operating the second radio as an access point in the first frequency band.*

*44. The apparatus of claim 43, wherein the radio resource management component is further operative to include the second radio of the first wireless access point in a Dynamic Channel Assignment process for the first frequency band with the plurality of wireless access points.*

*45. The apparatus of claim 34, wherein the selected operation mode comprises operating in a monitor mode in either or both of the first and second frequency bands.*

*46. The apparatus of claim 34, wherein the selected operation mode prevents the second radio from transmitting RF signals in the second frequency band.*

*47. A computer program product, comprising:*

*a non-transitory computer-readable storage medium having computer readable program code embodied therewith, wherein the computer readable program code is configured, when executed by a processor, to:*

*access inter-radio measurement data collected by a plurality of wireless access points, wherein the inter-radio measurement data relates to observations of*

*radio frequency (RF) signals transmitted between radios of the plurality of access points,*

*wherein one or more of the plurality of wireless access points comprises a first radio operative to transmit wireless signals in a first frequency band and a second radio operative to transmit wireless signals in a second frequency band;*

*determine from the inter-radio measurement data whether a first wireless access point of the wireless access points is redundant in relation to the second frequency band based on RF coverage provided by one or more neighboring access points;*

*if the first wireless access point is determined to be redundant, select for the second radio an operation mode from a plurality of operation modes; and*

*transmit a command to the first wireless access point to configure the second radio of the first wireless access point to operate in the selected operation mode.*

*48. The computer program product of claim 47, wherein the selected operation mode of the plurality of operation modes is a non-client serving role.*

*49. The computer program product of claim 48, wherein the non-client serving role comprises a monitoring function.*

*50. The computer program product of claim 47, wherein determining whether the first wireless access point of the wireless access points is redundant comprises:*

*selecting a set of points distributed within a coverage area of the second radio in the first access point;*

*calculating, based on the inter-radio measurement data, distances between each of a plurality of neighboring access points of the first access point and each of the set of points, wherein the plurality of neighboring access points are in direct communication with the second radio of the first access point; and*

*determining that a pre-defined number of the set of points are inside the coverage area of at least one of the plurality of neighboring access points based on the calculated distances.*

*51. The computer program product of claim 47, wherein determining whether the first wireless access point of the wireless access points is redundant comprises:*

*identifying a change to a total coverage area provided by the plurality of access points, if the second radio is prohibited from transmitting signals in the second frequency band; and*

*determining that the first wireless access point is redundant if the change is below a threshold value.*

*52. The computer program product of claim 47, wherein determining whether the first wireless access point of the wireless access points is redundant comprises:*

*calculating respective locations of neighboring wireless access points of the first access point; and*

*determining, based on the locations, that a coverage area of the second radio in the second frequency band is covered by at least one of the respective neighboring access points of the selected access point.*

*53. The computer program product of claim 47, wherein the second radio of the first wireless access point comprises a XOR radio configured to dynamically switch between the first frequency band and the second frequency band.*

*54. The computer program product of claim 47, wherein the first frequency band comprises a 5 GHz Wi-Fi frequency band and the second frequency band comprises a 2.4 GHz Wi-Fi frequency band.*

*55. The computer program product of claim 47, wherein selection of the operation mode is based on evaluation of one or more of RF conditions, available channel sets and client density in the network.*

*56. The computer program product of claim 47, wherein the selected operation mode comprises operating the second radio as an access point in the first frequency band.*

*57. The computer program product of claim 56, wherein the second radio of the first wireless access point is included in a Dynamic Channel Assignment process for the first frequency band with the plurality of wireless access points.*

*58. The computer program product of claim 47, wherein the selected operation mode comprises operating in a monitor mode in either or both of the first and second frequency bands.*

*59. The computer program product of claim 47, wherein the selected operation mode prevents the second radio from transmitting RF signals in the second frequency band.*

* * * * *